US012664839B2

(12) United States Patent
Debord et al.

(10) Patent No.: US 12,664,839 B2
(45) Date of Patent: Jun. 23, 2026

(54) SYSTEMS AND TECHNIQUES FOR MANAGING ACCESS CONTROL

(71) Applicant: JANUS INTERNATIONAL GROUP, LLC, Temple, GA (US)

(72) Inventors: William Debord, Woodstock, GA (US); Nathan Perry, Eagle Mountain, UT (US)

(73) Assignee: Janus International Group, LLC, Temple, GA (US)

( * ) Notice: Subject to any disclaimer, the term of this patent is extended or adjusted under 35 U.S.C. 154(b) by 69 days.

(21) Appl. No.: 18/493,983

(22) Filed: Oct. 25, 2023

(65) Prior Publication Data

US 2024/0144754 A1 May 2, 2024

Related U.S. Application Data

(60) Provisional application No. 63/439,687, filed on Jan. 18, 2023, provisional application No. 63/381,880, filed on Nov. 1, 2022.

(51) Int. Cl.
*G07C 9/10* (2020.01)
*G07C 9/00* (2020.01)
*G07C 9/33* (2020.01)

(52) U.S. Cl.
CPC ..... *G07C 9/00182* (2013.01); *G07C 9/00912* (2013.01); *G07C 9/33* (2020.01); *G07C 2009/00269* (2013.01)

(58) Field of Classification Search
CPC ...... G07C 2009/00269; G07C 2209/08; G07C 9/00182; G07C 9/00571; G07C 9/00912; G07C 9/33; G07C 9/00309; G07C 9/22; G07C 2009/00373; G07C 2009/00507; G07C 2009/00769; G07C 2009/00793; G07C 2009/00825; G07C 2209/63; G07C 9/00817; G07C 9/27; G07C 9/28; G07C 2009/00642; G07C 9/00563; G07C 9/00722; G07C 9/00896; G07C 9/29; G07C 9/38; H04W 12/08; H04W 4/80; H04W 4/023; H04W 48/18; H04W 64/00; H04W 84/12; H04W 88/02; H04W 88/06; H04W 12/082; H04W 4/08; Y10T 70/5973; H04B 17/318; E05B 2047/002; E05B 2047/005;

(Continued)

(56) References Cited

U.S. PATENT DOCUMENTS

| | | | |
|---|---|---|---|
| 7,825,796 | B1 | 11/2010 | Simon |
| 10,083,554 | B2 | 9/2018 | Mattern |

(Continued)

OTHER PUBLICATIONS

Search Report and Written Opinion; International Patent Application No. PCT/US2023/035887; Feb. 21, 2024.

(Continued)

*Primary Examiner* — Dionne Pendleton
(74) *Attorney, Agent, or Firm* — Barnes & Thornburg LLP

(57) ABSTRACT

Devices, systems, and methods for remotely accessing an access point within a self-storage facility can include receiving a request, from by a remote device, to unlock an access point within the self-storage facility, and activating a locking mechanism associated with the access point for unlocking. Credentialing can be applied, access lists can be provided, and/or expiration of a predetermined hold time can cause re-activating the locking mechanism for locking.

28 Claims, 5 Drawing Sheets

(58) Field of Classification Search

CPC ......... E05B 2047/0095; E05B 47/0001; E05B 47/0012; E05B 49/00; E05B 67/22; B60R 25/245; B60R 25/01; B60R 25/20; A47B 2031/003; A47B 2031/006; A61J 7/0445; A61J 7/0481; A61J 7/0454; A61J 7/0084; A61J 7/0463; G16H 20/13; G16H 15/00; G16H 40/20; G16H 40/67; G16H 70/40; A61G 12/001; G07F 17/0092; G07F 11/62; G07F 9/026; G07F 17/12; G07F 17/13; B65F 1/0053; B65F 1/1405; B65F 1/1615; B65F 1/1638; B65F 2210/108; B65F 2210/128; B65F 2210/168; B65F 2210/172; G06K 7/10297; G06K 7/10366; H04L 63/101; H04L 67/141; Y04S 40/20; G06Q 10/0837; G06Q 10/30

See application file for complete search history.

(56) References Cited

U.S. PATENT DOCUMENTS

| | | | | |
|---|---|---|---|---|
| 10,115,257 | B2 | 10/2018 | Abner | |
| 10,171,974 | B2 | 1/2019 | Ahearn et al. | |
| 10,378,241 | B2 | 8/2019 | Al-Kahwati et al. | |
| 11,423,718 | B2 | 8/2022 | Lee et al. | |
| 11,823,517 | B2 | 11/2023 | Haci et al. | |
| 12,148,258 | B2 | 11/2024 | Imanuel | |
| 2008/0243859 | A1 | 10/2008 | Lapointe | |
| 2009/0210089 | A1 * | 8/2009 | Christie | G16H 20/13 700/244 |
| 2012/0062362 | A1 | 3/2012 | Rudduck et al. | |
| 2012/0169461 | A1 | 7/2012 | Dubois, Jr. | |
| 2016/0090774 | A1 | 3/2016 | Reynolds | |
| 2018/0137704 | A1 | 5/2018 | Caterino et al. | |
| 2019/0180354 | A1 | 6/2019 | Greenberger et al. | |
| 2019/0228601 | A1 | 7/2019 | Grzenda et al. | |
| 2020/0250909 | A1 | 8/2020 | Li et al. | |
| 2021/0019972 | A1 | 1/2021 | Roper et al. | |
| 2021/0019979 | A1 | 1/2021 | Mackenzie et al. | |
| 2021/0042762 | A1 | 2/2021 | Budano et al. | |
| 2022/0051499 | A1 * | 2/2022 | Schwartz | G06K 7/10297 |
| 2022/0101423 | A1 | 3/2022 | Minsley et al. | |
| 2024/0109513 | A1 * | 4/2024 | Liu | H04W 4/44 |

OTHER PUBLICATIONS

International Search Report & Written Opinion in PCT/US2023/036373, mailed Feb. 21, 2024.

International Preliminary Report on Patentability in PCT/US2023/035887, mailed May 15, 2025.

* cited by examiner

400

SYSTEMS AND TECHNIQUES FOR MANAGING ACCESS CONTROL

CROSS-REFERENCE

This utility patent application claims the benefit of priority to U.S. Provisional Application No. 63/439,687, filed on Jan. 18, 2023, entitled "SYSTEMS AND TECHNIQUES FOR MANAGING REMOTE ACCESS TO AN ACCESS CONTROL DEVICE", and to U.S. Provisional Application No. 63/381,880, filed on Nov. 1, 2022, entitled "VARIOUS ELECTRONIC AND COMMUNICATIONS SECURITY ARRANGEMENTS CVT", the contents of each of which are hereby incorporated by reference in their entireties.

FIELD

The present disclosure generally relates to a system and techniques for managing and providing access to multiple access points within a facility.

Self-storage facilities rent storage space to tenants such as individuals and businesses. A self-storage facility may separate its storage space by unit. While a unit can be anything from lockers, containers, to even outdoor spaces, a typical unit often corresponds to an enclosed and climate-controlled room that is accessible via a lockable door. A self-storage facility may grant access to a given unit though various means, such as a physical key, a unique code to be input on a keypad, a digital key generated using tenant credentials, and the like.

Generally, a self-storage facility has a number of access points that require a tenant to have valid credentials to be able to pass. These access points can include a gate securing the entrance to the exterior of the facility, a door leading to the storage unit area, elevators, storage units, and so on. Valid credentials can include a physical key, an access code for user entry, a key fob or card for wireless communication, or a mobile device for wireless communication. At times, however, it is desirable for a user to grant access to one or more units while the user is not physically present. For example, an operator of the self-storage facility may want to show a unit to a prospective tenant or an inspector without being at the facility or at another location within the facility. This may be due to a variety of factors, such as the operator managing multiple facilities from a central location, adherence to government-issued health guidelines, and so on.

SUMMARY

Embodiments presented herein disclose a system and techniques for remotely providing access to (or accessing) multiple access points within a facility.

According to one aspect of the present disclosure, a method for remotely accessing an access point within a self-storage facility may include receiving a request, from a remote device, to unlock an access point within the self-storage facility; and activating a locking mechanism associated with the access point for unlocking. The method may include, after expiration of a predetermined hold time, activating the locking mechanism for locking.

In some embodiments, the request may include the predetermined hold time. The request may include a request to unlock multiple access points within the self-storage facility. Activating the locking mechanism for unlocking may include unlocking the multiple access points, responsive to the request to unlock the multiple access points. Activating the locking mechanism for locking may include activating the multiple locking mechanisms for locking after expiration of the predetermined period of time. In some embodiments, the predetermined period of time may include individual predetermined periods of time for each of the multiple locking mechanisms.

In some embodiments, the method may further include evaluating user credentials for authorization to access the access point, responsive to the request. Activating the locking mechanism associated with the access point for unlocking may be conducted responsive to confirmation of authorization under evaluating user credentials.

In some embodiments, the method may further include identifying access points to which the user is authorized for access, responsive to the request. The method may further include sending the identified access points to the remote device for presentation to the user. In some embodiments, the method may further include receiving a selection of the identified access points for unlocking. Activating the locking mechanism for unlocking may include activating the selection of the identified access points for unlocking. In some embodiments, receiving the request from the remote device may include receiving the request from a personal mobile device.

According to another aspect of the present disclosure, a system for remotely accessing an access point within a self-storage facility may include at least one processor configured to execute instructions stored on memory to conduct operations including: receiving a request, from by a remote device, to unlock an access point within the self-storage facility; and activating a locking mechanism associated with the access point for unlocking. After expiration of a predetermined hold time, the system may activate the locking mechanism for locking.

In some embodiments, the system may include a gateway device for providing commands for activating unlocking. The gateway device may be arranged in communication with a network for communication with the remote device. The remote device may be a personal mobile device.

In some embodiments, the at least one processor may be configured for evaluating user credentials for authorization to access the access point, responsive to the request. The processor may be configured for activating the locking mechanism associated with the access point for unlocking responsive to confirmation of authorization under evaluating user credentials. In some embodiments, the at least one processor may be configured for identifying access points to which the user is authorized for access, responsive to the request. The at least one processor may be configured for sending the identified access points to the remote device for presentation to the user. In some embodiments, the at least one processor may be configured for receiving a selection of the identified access points for unlocking. Activating the locking mechanism for unlocking may include activating the selection of the identified access points for unlocking. Configuration of the processor may include configured to execution instructions stored on the memory.

In some embodiments, the request may include the predetermined hold time. The request may include a request to unlock multiple access points within the self-storage facility. Activating the locking mechanism for unlocking may include unlocking the multiple access points, responsive to the request to unlock the multiple access points. Activating the locking mechanism for locking may include activating the multiple locking mechanisms for locking after expiration of the predetermined period of time. In some embodiments, the predetermined period of time may include individual predetermined periods of time for each of the multiple locking mechanisms.

In some embodiments, the at least one processor may further be configured for evaluating user credentials for authorization to access the access point, responsive to the request. Activating the locking mechanism associated with the access point for unlocking may be conducted responsive to confirmation of authorization under evaluating user credentials.

In some embodiments, the at least one processor may further be configured for identifying access points to which the user is authorized for access, responsive to the request. The at least one processor may further be configured for sending the identified access points to the remote device for presentation to the user. In some embodiments, the at least one processor may further be configured for receiving a selection of the identified access points for unlocking. Activating the locking mechanism for unlocking may include activating the selection of the identified access points for unlocking. In some embodiments, receiving the request from the remote device may include receiving the request from a personal mobile device. In some embodiments, the system may include the remote device.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

DETAILED DESCRIPTION

Embodiments presented herein disclose systems and techniques for remotely managing providing access to one or more points of entry within a facility, such as a self-storage facility. In an embodiment, a storage facility system includes one or more access control devices connected as part of a communication network, such as by one or more gateway devices connected to a cloud network. Further, a mobile device of a user (e.g., an owner of a storage unit, an operator of the self-storage facility) includes a mobile app that allows the user to interface with the storage facility system (e.g., via communication with a service running on the cloud network). For instance, the app, through communication with the cloud service, may display information relating to authorized access points, such as storage units owned by or rented to the user.

As further described herein, the user may control access to the access points from a remote location (e.g., outside the storage facility) via the cloud service. Particularly, techniques describe remotely maintaining an access status (e.g., access point open, access point accessible to a certain user, access closed, etc.) for a specified amount of time.

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Figure 1:
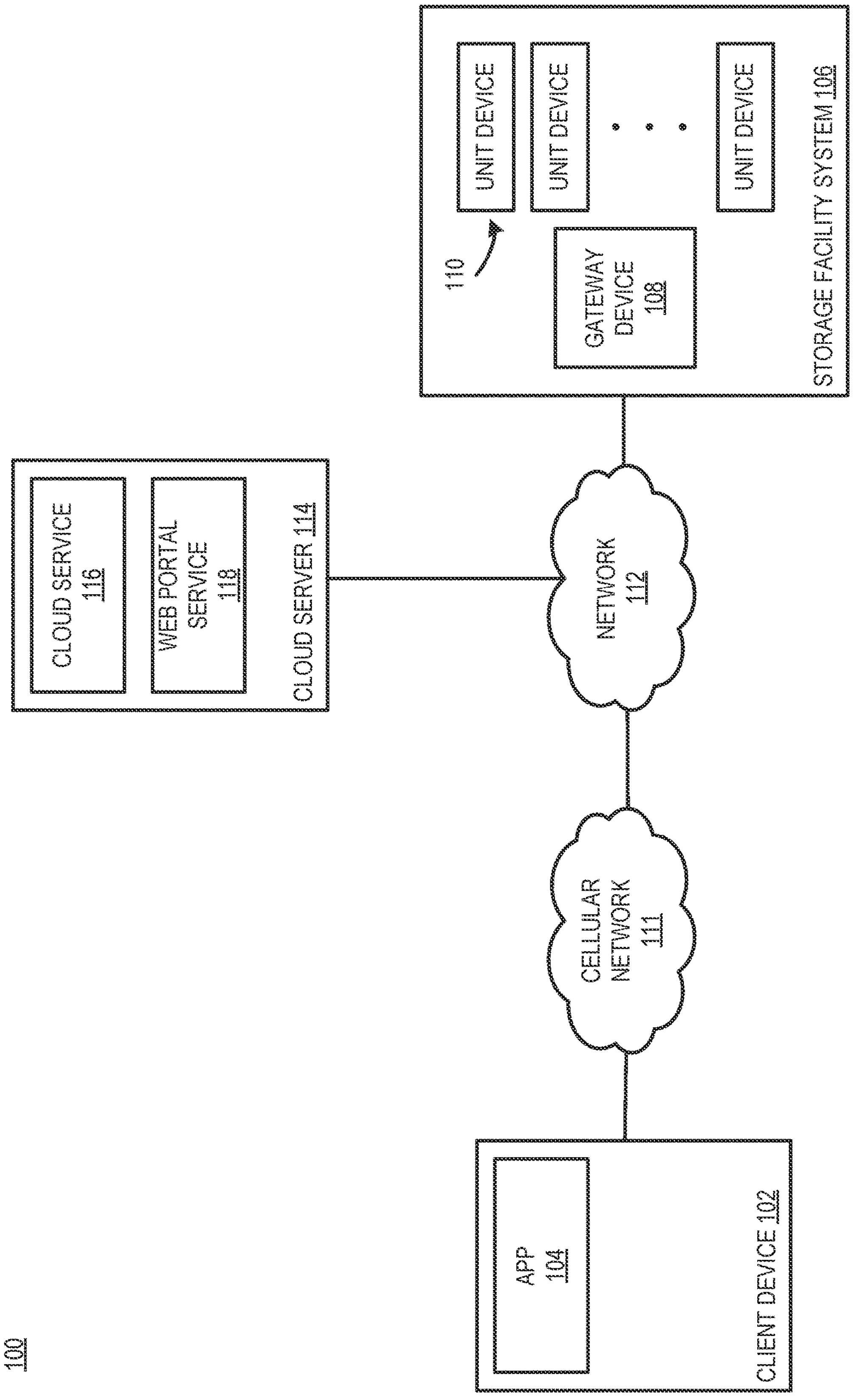
FIG. 1 illustrates an example environment in which a client device may interface with a storage facility system to remotely grant access to multiple access points of the storage facility system, according to illustrative embodiments.

FIG. 1 illustrates an example computing environment 100 in which a client device 102 may interface with a storage facility system 106 (via a cloud service 116 hosted on a cloud server 114) to enter one or more access points thereof, according to an embodiment. As shown, the client device 102, storage facility system 106, and cloud server 114 are connected to a network 112 (e.g., the Internet) via cellular network 111), although in some embodiments, the client device 102 may be configured for communication with the network 112 directly, for example, via or as a wifi, mesh network (e.g., wirepas), or similar local/private network of the storage facility once within appropriate range. In some embodiments, the storage facility system 106 and cloud server 114 may be in communication with one another via a private network (not shown).

The client device 102 may be embodied as any physical computing device accessible by a user (e.g., a tenant user, an operator or employee of the storage facility system 106, a system administrator, etc.) having wireless communication functionality, such as a smart phone, smart tablet, laptop device, wearable electronic, etc. The client device 102 may be owned by a tenant user, a device located on-site at the underlying self-storage facility, a device located remotely from the self-storage facility (e.g., at a management console associated with the self-storage facility), and so on. Illustratively, the client device 102 also includes an app 104. As further described herein, the app 104 allows the user to interface with the storage facility system 106 and access a variety of features provided by the system 106 from any location from which the mobile device 112 can establish a connection with network 112. For example, through the app 104, the user may remotely interface with authorized locking mechanisms of the storage facility system 106.

In the illustrative embodiment, the storage facility system 106 comprises a local network (different from the network 112) of interconnected devices to control various features of the underlying self-storage facility, such as unit door control, HVAC settings and temperature control, tenant access, facility monitoring, and so on, in addition to the one-touch unlock authentication techniques described herein. Illustratively, the storage facility system 106 includes a gateway device 108 and one or more unit devices 110. The cloud server 114 may be embodied as one or more physical or virtual computing resources pooled together to provide cloud-based services, such as the cloud service 116. The cloud service 116 processes requests sent by the app 104 and transmits the processed requests to the storage facility system 106. The storage facility system 106 may also transmit information to the app 104 via the cloud service 116.

The gateway device 108 may be embodied as any suitable physical computing or networking device (e.g., a router, hub device, switch, etc.) to communicate with devices within the storage facility system 106 and also with the cloud server 114. The unit devices 108 may be embodied as any suitable physical computing or networking device (e.g., a networking beacon, an Internet-of-Things device, mobile device, etc.) that is co-located with an access point within the facility, such as a door, gate, elevator unit, storage unit entrance, and so on. Each unit device 108 may include a processor, memory, and network circuitry that enables wired and/or wireless communication with the gateway device 108 and the app 104. The gateway device 108 may communicate using wired and/or wireless protocols (e.g., Bluetooth, wirepas, etc.) with the unit devices 110 to control the unit devices 110 or trigger the unit devices 110 to perform certain actions, such as triggering the unit device 110 to activate a locking mechanism on an access point. In the illustrative embodiment, the gateway device 108 is arranged in wired communication with the network 112, but in some embodiments, may include wireless communication with the network 112.

In the illustrative embodiment, the app 104, during execution, may transmit requests to the cloud service 116 to control the locking and unlocking of access points managed by the storage facility system 106. The app 104 may also specify a length of time during which the access point is locked or unlocked. Such determination provides an efficient method for remotely controlling access to a user's authorized access points of the storage facility system 106, e.g., such as in instances in which the user is away from the storage facility system 106 and needs to provide access to the access point (e.g., if the user wishes to show a given storage unit to a prospective tenant who is on-site at the storage facility system 106).

Figure 2:
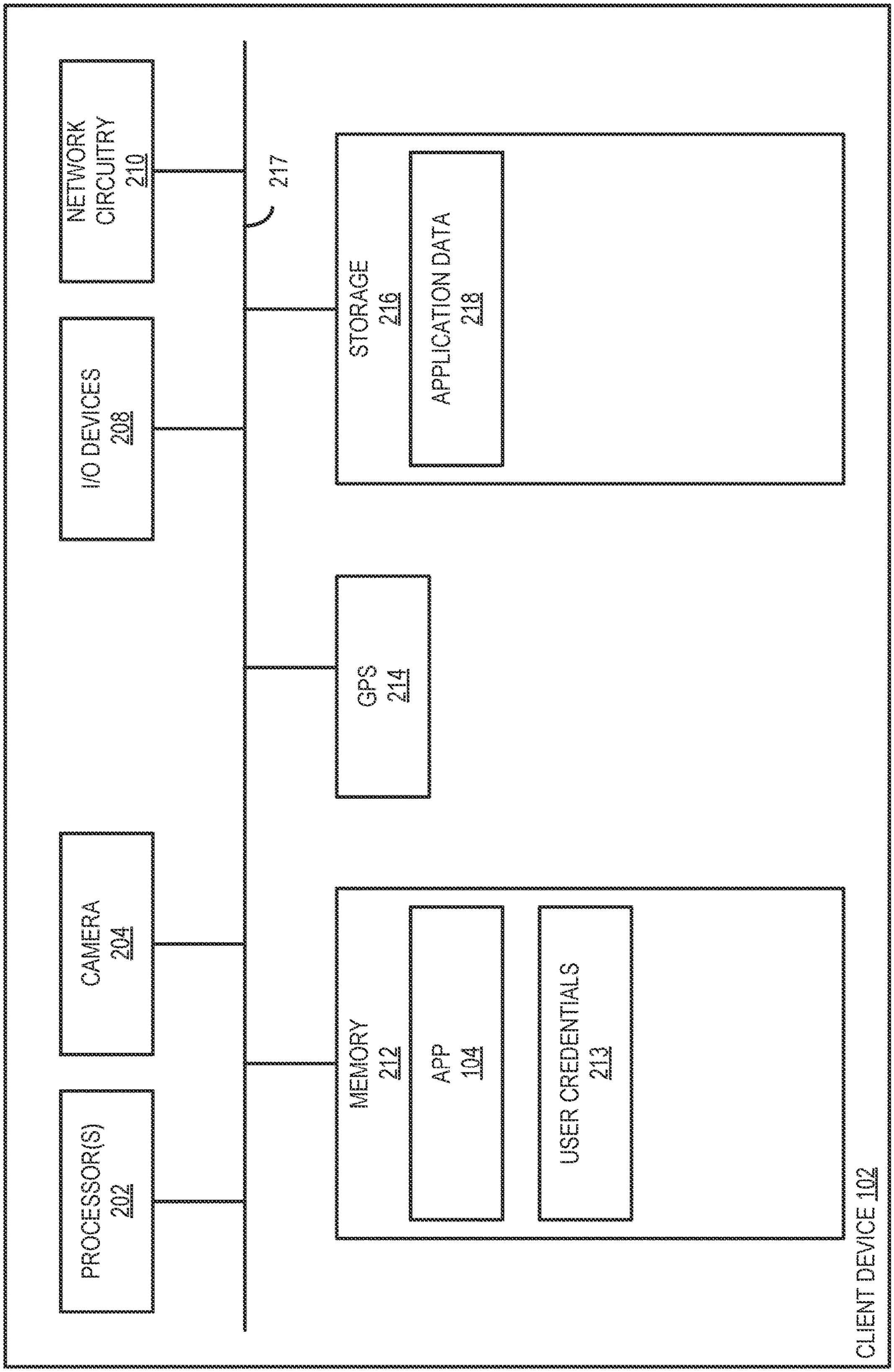
FIG. 2 illustrates a block diagram of the client device described relative to FIG. 1, according to illustrative embodiments.

FIG. 2 further illustrates the client device 102, according to an example embodiment. As shown, the client device 102 includes, without limitation, one or more processors 202, a camera 204 and other I/O devices 208 coupled with an I/O device interface (not shown), network circuitry 210, a memory 212, a GPS 214, and a storage 216, each interconnected via a hardware bus 217. Of course, an actual client device 102 will include a variety of additional hardware components not shown.

The processor 202 retrieves and executes programming instructions stored in the memory 212, such as those of the app 104. Similarly, the processor 202 generates user credentials (e.g., dynamically generated login information and encryption/decryption keys, digital key credentials, etc.) 213 as well as stores and retrieves application data 218 (e.g., tenant user configuration information, user data, registered unit data, etc.) associated with the app 104 residing in the storage 216. The hardware bus 217 is used to transmit instructions and data between the interconnected components. The processor 202 is included to be representative of a single CPU, multiple CPUs, a single CPU having multiple processing cores, and the like. The memory 212 is generally included to be representative of memory and storage on a mobile device, e.g., DDR and flash memory spaces. The network circuitry 210 may be embodied as any hardware, software, or circuitry (e.g., a network interface card) used to connect the client device 102 over the network 112 and providing the network communication functions described above. The GPS 214 includes a receiver that obtains signals from radio navigation system satellites indicative of geolocation data of the client device 102.

The I/O device interface allows the camera 204 and other I/O devices 208 to communicate with hardware and software components of the client device 102. The I/O devices 208 may be embodied as any type of input/output device connected with or provided as a component to the client device 102, such as the speaker and microphone devices. I/O devices such as keyboards, mice, and printers may be included as I/O devices 212 (e.g., to print map of the storage facility indicating a location of a registered unit). As stated, the memory 212 includes the app 104 and user credentials 213.

Figure 3:
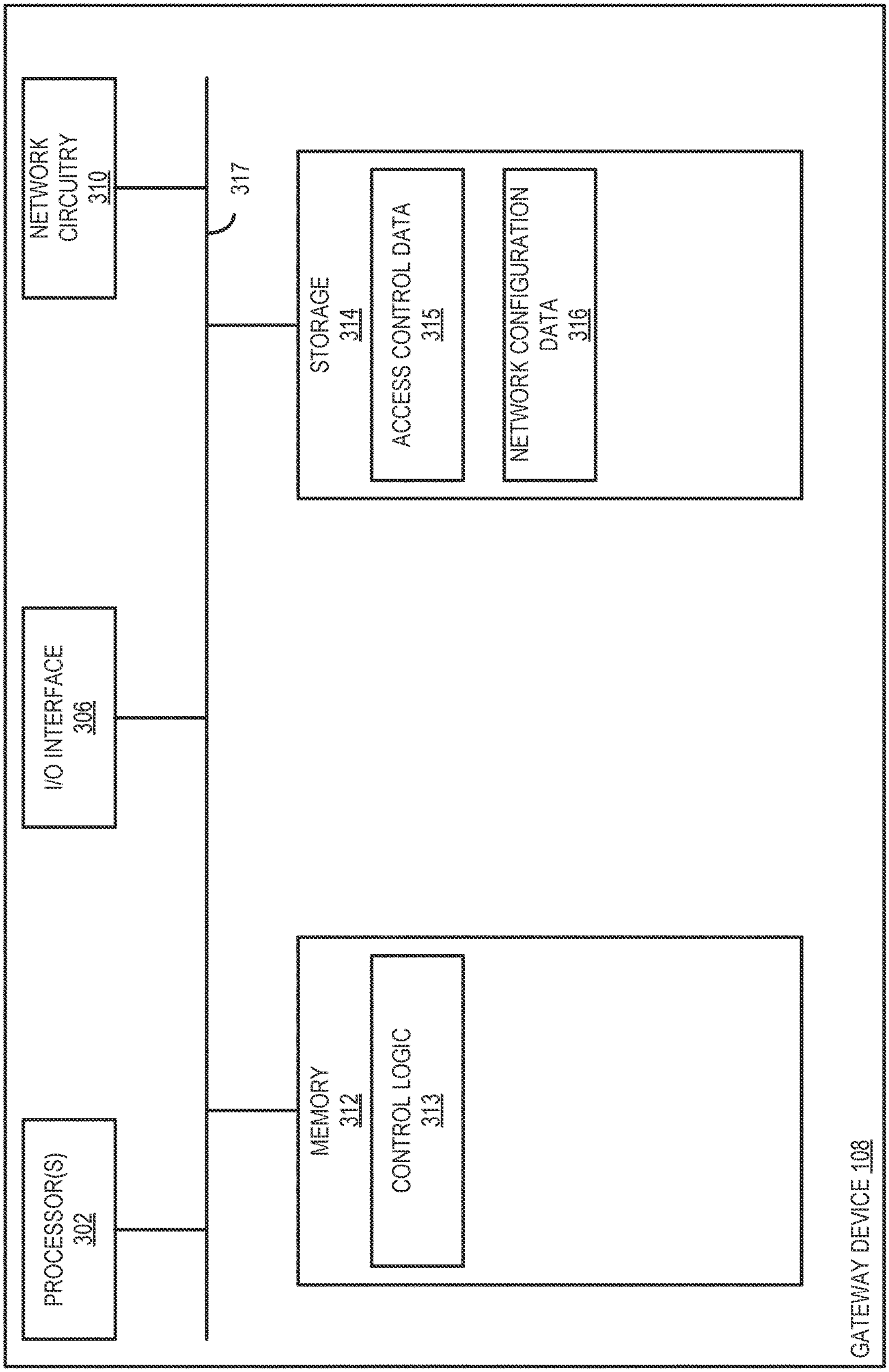
FIG. 3 illustrates a block diagram of the gateway described relative to FIG. 1, according to illustrative embodiments.

FIG. 3 further illustrates the gateway device 108, according to an example embodiment. As shown, the gateway device 108 includes, without limitation, one or more processors 302, an I/O interface 306, a network circuitry 310, a memory 312, and a storage 314, each interconnected via a hardware bus 317. Of course, a gateway device 108 will include a variety of additional hardware components. Further, some components shown herein, such as the storage 314, can reside separate from the gateway device 108 (e.g., as cloud storage or a remote storage host).

The processor 302 retrieves and executes programming instructions stored in the memory 312, such as control logic 313. Similarly, the processor 302 stores and retrieves data residing in the storage 314, such as access control data 315 (providing access rules, policies, and user access privilege data for the underlying storage facility) and network configuration data 316 (e.g., network topology information, routing tables, etc.). The hardware bus 317 is used to transmit instructions and data between the processor 302, storage 314, network interface 310, and the memory 312. The processor 302 is included to be representative of a single CPU, multiple CPUs, a single CPU having multiple processing cores, and the like. The memory 312 is generally included to be representative of memory and storage on a mobile device, e.g., DDR and flash memory spaces. The network circuitry 310 may be embodied as any hardware, software, or circuitry (e.g., a network interface card) used to connect the gateway device 108 over one or more networks (e.g., to the network 112 and to a local area network) and providing the network communication functions described above.

The I/O interface 306 allows I/O devices (not shown) to communicate with hardware and software components of the gateway device 108. The I/O devices may be embodied as any type of input/output device that can be connected with or provided as a component to the gateway device 108, such as keyboards, mouse devices, and printers.

Illustratively, the memory 312 includes the control logic 313, which may be embodied as any hardware, software, or circuitry to process communications from the cloud service 116 and also format and transmit communications to unit devices 110 in response to communications from the app 104. Further, the storage 314 includes the aforementioned access control data 315 and network configuration data 316.

Figure 4:
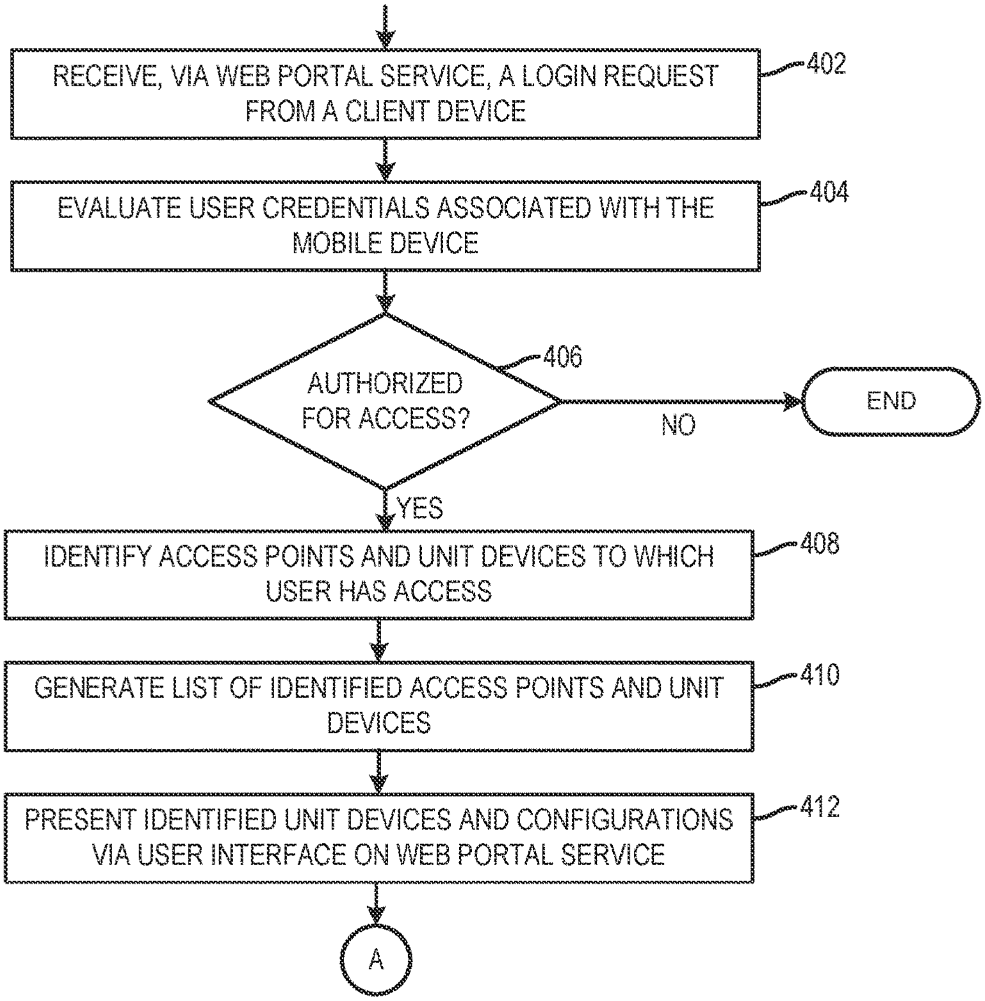
FIGS. 4 and 5 illustrate a flow diagram of an example method for managing access to one or more access points of the storage facility system, according to an embodiment, according to illustrative embodiments.

FIG. 4 illustrates an example method 400 for a flow diagram of an example method for remotely controlling user access to one or more access points of a storage facility system, according to the illustrative embodiment. As shown, the method 400 begins in block 402, in which the cloud service 116 receives, via a web portal service, a login request from client device 102. The login request may include user credentials associated with the underlying user of the app 104. In block 404, the cloud service 116 evaluates the user credentials included with the request. In block 406, the cloud service 116 determines, based on the user credentials, whether the user is authorized for access to any of the access points within the storage facility system 106. If not, then the method 400 ends. Otherwise, in block 408, the cloud service 116 identifies, based on the user credentials and access control data, access points and unit devices within the storage facility system 106 to which the user has access. For example, the access control data may indicate (e.g., using identifiers associated with each access point and unit device) those units to which the user has authorized access. For example, such authorized access points may be storage units which the user has leased and is within appropriate contractual terms. In block 410, the cloud service 116 generates a list of the access points to which the user has access, e.g., using the previously retrieved identifiers. In block 412, the cloud service 116 presents the identified unit devices and configurations via a user interface on the web portal service viewable by the app 104.

In the illustrative embodiment, presentation of the identified unit devices via the user interface includes a user-interactive experience in which the user may select one or more of the identified unit devices for access. For example, multiple identified unit devices may be selected for requesting unlocking. As discussed below, request for unlocking may include a hold time, and the user may enable and/or adjust the amount of time for the hold time for one or more identified unit devices via the user interface, for example, via numerical input and/or slider bar, for communication as part of the request.

Figure 5:
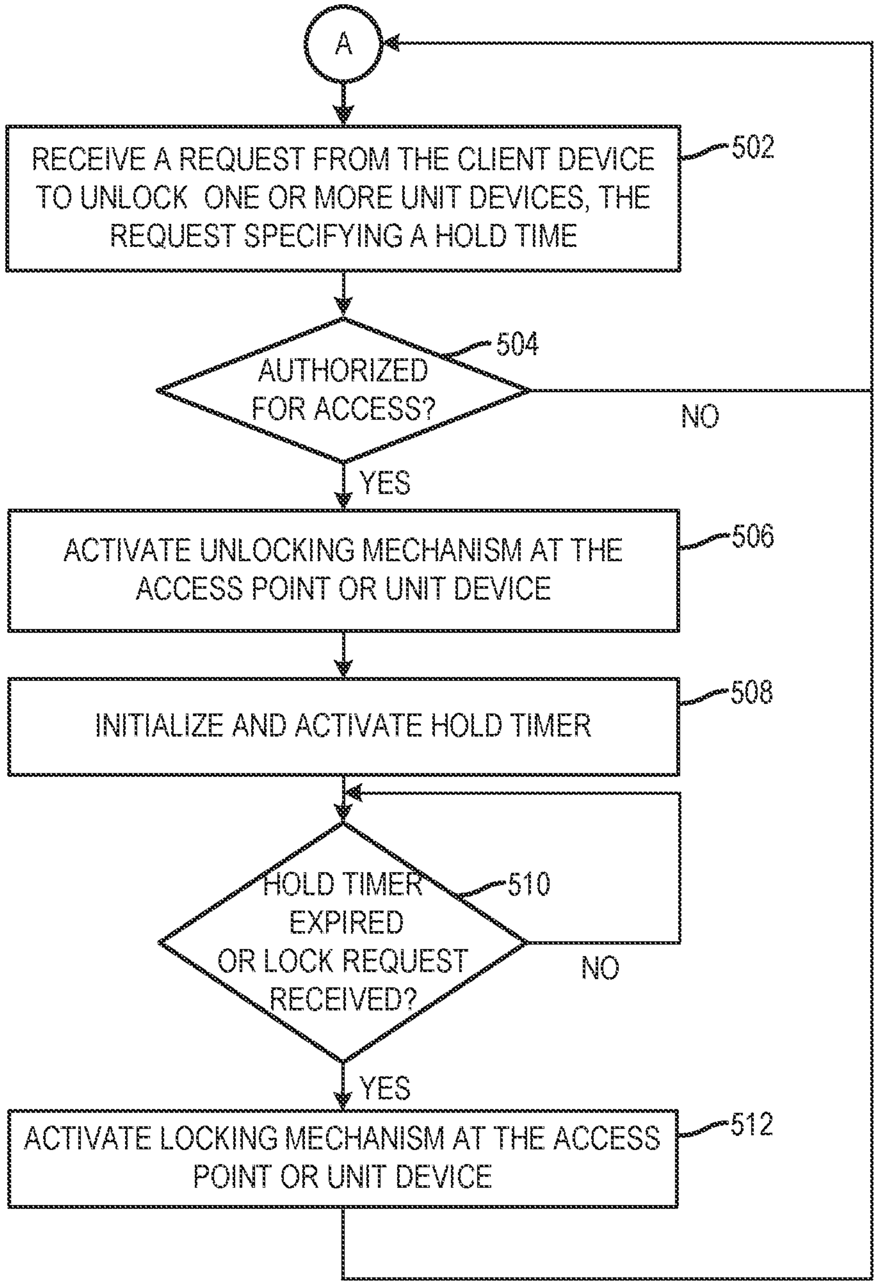

FIG. 5 illustrates a flow diagram of an example method 500 for controlling access to an access point within the storage facility system 106. The method 500 begins from block A. In block 502, the cloud service 116 receives a request from the client device 102 (e.g., from the app 104 executing on the client device 102) to unlock one or more unit devices (or access points) within the storage facility system 106. Further, the request may specify a hold time, which is a period during which the unit device is to remain in an unlock state. In block 504, the cloud service 116 may determine, e.g., based on user credentials provided with the request, whether the underlying user has authorization to unlock the request unit device or access point. If not, then the method 500 returns to block A.

Otherwise, in block 506, the cloud service 116 communicates to the gateway device 108 to activate an unlocking mechanism at the specified unit device or access point. The communication may also specify the requested hold time during which to keep the specified unit device or access point unlocked. In turn, the gateway device 108 activates the unlocking mechanism at the unit device or access point.

In block 508, the gateway device 108 may initialize and activate the hold timer for the specified amount of time. In block 510, the gateway device 108 determines whether the hold time has expired (or otherwise an instruction to lock from the cloud service 116) has been received. If not, then the method 500 returns to 510 until either the hold timer has expired or a lock request has been received. In block 512, after expiration of the hold time (or upon an instruction from the cloud service 116 to lock the access point or unit device), the gateway 108 activates a locking mechanism on the access point or unit device.

In the illustrative embodiment, the unit device can provide confirmation of status to the gateway device 108, for example, whether in a locked or unlocked state. Upon hold time expired locking, the gateway device 108 can confirm actual locking according to the confirmation of status from the unit device. In the event that locking status cannot be confirmed, for example, upon an associated door remaining ajar, the gateway device 108 may issue an alert. In the illustrative embodiment, the alert is a message sent to the client device 102 indicating failure to re-lock upon expiration of the hold time. In some embodiments, the alert may include other local and/or remote messages, whether written, audio (e.g., alarms), and/or visual (e.g., lights).

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration only, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

The control systems disclosed herein illustratively includes a processor embodied as a microprocessor, memory for storing instructions for execution by the processor, and communications circuitry for conducting related operations. Examples of suitable processors may include one or more microprocessors, integrated circuits, system-on-a-chips (SoC), among others. Examples of suitable memory, may include one or more primary storage and/or non-primary storage (e.g., secondary, tertiary, etc. storage); permanent, semi-permanent, and/or temporary storage; and/or memory storage devices including but not limited to hard drives (e.g., magnetic, solid state), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory; among others. Communication circuitry may include components for facilitating processor operations, for example, suitable components may include digital and/or analog components, transmitters, receivers, modulators, demodulators, filters, modems, analog/digital (AD or DA) converters, diodes, switches, operational amplifiers, and/or integrated circuits.

Embodiments in accordance with the disclosure may be implemented in hardware, firmware, software, or any combination thereof. Embodiments may also be implemented as instructions stored using one or more machine-readable media which may be read and executed by one or more processors. A machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided in sub-modules, sub-processes or other units of computer code or data as may be required by a particular design or implementation of the computing device.

In the drawings, specific arrangements or orderings of elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships, or associations between elements may be simplified or not shown in the drawings so as not to obscure the disclosure.

This disclosure is considered to be exemplary and not restrictive. In character, and all changes and modifications that come within the spirit of the disclosure are desired to be protected. While particular aspects and embodiments are disclosed herein, other aspects and embodiments will be apparent to those skilled in the art in view of the foregoing teaching.

While the foregoing is directed to embodiments of the present disclosure, other and further embodiments of the disclosure may be devised without departing from the basic scope thereof, and the scope thereof is determined by the claims that follow.

What is claimed is:

1. A method for remotely accessing an access point within a self-storage facility, the method comprising:
- receiving a request, from a remote device, to unlock an access point within the self-storage facility, wherein the request includes the predetermined hold time;
- identifying access points to which the user is authorized for access, responsive to the request;
- sending the identified access points for presentation to the user;
- receiving a selection from the identified access points for unlocking;
- activating a locking mechanism associated with the access point for unlocking; and
- after expiration of the predetermined hold time, activating the locking mechanism for locking.

2. The method of claim 1, wherein the request includes a request to unlock multiple access points within the self-storage facility.

3. The method of claim 2, wherein activating the locking mechanism for unlocking includes unlocking the multiple access points, responsive to the request to unlock the multiple access points.

4. The method of claim 3, wherein activating the locking mechanism for locking includes activating the multiple locking mechanisms for locking after expiration of the predetermined period of time.

5. The method of claim 4, wherein the predetermined period of time includes individual predetermined periods of time for each of the multiple locking mechanisms.

6. The method of claim 1, further comprising evaluating user credentials for authorization to access the access point, responsive to the request.

7. The method of claim 6, wherein activating a locking mechanism associated with the access point for unlocking is conducted responsive to confirmation of authorization under evaluating user credentials.

8. The method of claim 1, wherein activating the locking mechanism for unlocking includes activating the selection from the identified access points for unlocking.

9. The method of claim 1, wherein receiving the request from the remote device includes receiving the request from a personal mobile device.

10. A system for remotely accessing an access point within a self-storage facility, the system comprising:
- at least one processor configured to execute instructions stored on memory to conduct operations including:
  - receiving a request by a remote device, to unlock an access point within the self-storage facility, wherein the request includes the predetermined hold time;
  - identifying access points to which the user is authorized for access, responsive to the request;
  - sending the identified access points for presentation to the user;
  - activating a locking mechanism associated with the access point for unlocking; and
  - after expiration of the predetermined hold time, activating the locking mechanism for locking.

11. The system of claim 10, wherein the system comprises a gateway device for providing commands for activating unlocking.

12. The system of claim 11, wherein the gateway device is arranged in communication with a network for communication with the remote device.

13. The system of claim 12, wherein the remote device is a personal mobile device.

14. The system of claim 10, wherein the at least one processor is configured for evaluating user credentials for authorization to access the access point, responsive to the request, and activating the locking mechanism associated with the access point for unlocking is conducted responsive to confirmation of authorization under evaluating user credentials.

15. The system of claim 10, wherein activating the locking mechanism for unlocking includes activating a selection from the identified access points for unlocking.

16. The system of claim 10, wherein the at least one processor is configured for receiving a selection of the identified access points for unlocking, wherein activating the locking mechanism for unlocking includes activating the selection of the identified access points for unlocking.

17. A method for remotely accessing access points within a self-storage facility, the method comprising:
- receiving a request, from a remote device, to unlock multiple access points within the self-storage facility, wherein the request includes a predetermined hold time;
- activating a locking mechanism associated with each of the multiple access points for unlocking, responsive to the request to unlock the multiple access points; and
- after expiration of the predetermined hold time, activating the locking mechanism associated with each of the multiple access points for locking, wherein the predetermined period of time includes individual predetermined periods of time for each of the multiple locking mechanisms.

18. The method of claim 17, further comprising evaluating user credentials for authorization to access the access points, responsive to the request.

19. The method of claim 18, wherein activating the locking mechanism associated with each of the access points for unlocking is conducted responsive to confirmation of authorization under evaluating user credentials.

20. The method of claim 18, further comprising identifying access points to which the user is authorized for access, responsive to the request.

21. The method of claim 20, further comprising sending the identified access points to the remote device for presentation to the user.

22. The method of claim 21, further comprising receiving a selection of the identified access points for unlocking, wherein activating the locking mechanism associated with each of the access points for unlocking includes activating the locking mechanism associated with each of the selection from the identified access points for unlocking.

23. The method of claim 18, wherein receiving the request from the remote device includes receiving the request from a personal mobile device.

24. A system for remotely accessing one or more access points within a self-storage facility, the system comprising:

at least one processor configured to execute instructions stored on memory to conduct operations including:

receiving a request from a remote device to unlock one or more access points within the self-storage facility, wherein the request includes a predetermined hold time;

activating a locking mechanism associated with each of the one or more access points for unlocking; and after expiration of the predetermined hold time, activating the locking mechanism of each of the one or more access points for locking;

and a gateway device for providing commands for activating unlocking, wherein the gateway device is arranged in communication with a network for communication with the remote device.

25. The system of claim 24, wherein the remote device is a personal mobile device.

26. The system of claim 24, wherein the at least one processor is configured to execute instructions stored on memory to conduct operations including identifying access points to which the user is authorized for access, responsive to the request.

27. The system of claim 26, wherein the at least one processor is configured to execute instructions stored on memory to conduct operations including sending the identified access points to the remote device for presentation to the user.

28. The system of claim 27, wherein the at least one processor is configured to execute instructions stored on memory to conduct operations including receiving a selection of the identified access points for unlocking, wherein activating the locking mechanism for unlocking includes activating the selection from the identified access points for unlocking.

* * * * *